US008988466B2

(12) United States Patent
Jin et al.

(10) Patent No.: US 8,988,466 B2
(45) Date of Patent: Mar. 24, 2015

(54) PANORAMIC IMAGE STRAIGHTENING

(75) Inventors: Hailin Jin, Campbell, CA (US); Martin E. Newell, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1635 days.

(21) Appl. No.: 11/638,896

(22) Filed: Dec. 13, 2006

(65) Prior Publication Data

US 2008/0143748 A1    Jun. 19, 2008

(51) Int. Cl.
*G09G 5/00* (2006.01)
*G06K 9/36* (2006.01)
*G06K 9/32* (2006.01)
*G06T 3/40* (2006.01)

(52) U.S. Cl.
CPC .................................... *G06T 3/40* (2013.01)
USPC ........... 345/649; 345/634; 345/656; 382/285; 382/294

(58) Field of Classification Search
USPC .................... 345/629–634, 656; 382/285, 294
See application file for complete search history.

(56) References Cited

U.S. PATENT DOCUMENTS

| | | | | |
|---|---|---|---|---|
| 5,586,231 A | * | 12/1996 | Florent et al. | 345/472 |
| 5,594,845 A | * | 1/1997 | Florent et al. | 345/427 |
| 5,912,670 A | * | 6/1999 | Lipscomb et al. | 345/419 |
| 6,031,541 A | * | 2/2000 | Lipscomb et al. | 345/420 |
| 6,097,854 A | | 8/2000 | Szeliski et al. | |
| 7,006,707 B2 | * | 2/2006 | Peterson | 382/285 |
| 7,103,236 B2 | * | 9/2006 | Peterson | 382/294 |
| 7,471,849 B2 | * | 12/2008 | Peterson | 382/275 |
| 2003/0048959 A1 | * | 3/2003 | Peterson | 382/284 |
| 2006/0042176 A1 | | 3/2006 | Hendricks | |
| 2006/0072176 A1 | * | 4/2006 | Silverstein et al. | 358/540 |

FOREIGN PATENT DOCUMENTS

| | | |
|---|---|---|
| WO | WO/98/54674 | 12/1998 |
| WO | WO 99/06943 | 2/1999 |

OTHER PUBLICATIONS

International Search Report and Written Opinion, PCT/US2007/087280, May 15, 2007, 15 pages.

(Continued)

*Primary Examiner* — M Good Johnson
(74) *Attorney, Agent, or Firm* — Shook Hardy & Bacon LLP

(57) ABSTRACT

Systems, methods, and apparatus, including computer program products, are provided for forming composite images. In some implementations, a method is provided. The method includes receiving a set of component images for forming a composite image and defining a first projection for the set of component images corresponding to a first reference frame. The method also includes identifying a plane corresponding to a point of view of the set of component images, where a normal to the plane corresponds to a second reference frame, defining a second projection for the set of component images corresponding to the second reference frame, the second reference frame corresponding to a rotation from the first reference frame defined using the normal of the identified plane, and rendering the composite image according to the second projection.

12 Claims, 3 Drawing Sheets

(56) References Cited

OTHER PUBLICATIONS

Brown, M. et al., "Automatic Panoramic Image Stitching Using Invariant Features," Dept. of Computer Science, University of British Columbia, Vancouver, Canada (16 pages), retrieved on Dec. 13, 2006 from http://research.microsoft.com/~brown/papers/ijcv2006.pdf.
International Preliminary Report on Patentability, PCT/US2007/087280, Jun. 16, 2009, 7 pages.

* cited by examiner

PANORAMIC IMAGE STRAIGHTENING

BACKGROUND

This specification relates to composite image formation.

Image capture devices, such as cameras, can be used to capture an image of a section of a view, such as a section of a landscape. The section of the view whose image is captured by a camera is known as the field of view of the camera. Adjusting a lens associated with a camera may increase the field of view. However, there is a limit beyond which the field of view of the camera cannot be increased without compromising the quality or resolution of the captured image. It is sometimes necessary to capture an image of a view that is larger than can be captured within the field of view of a camera. To do so, multiple overlapping images of segments of the view can be taken and then the images can be joined together (e.g., merged) to form a composite image, known as a panoramic image.

To form a composite image, the relative positions of the component images representing adjacent sections of the view must be determined. In some systems, a first pair of component images are aligned. Additional component images are aligned with respect to the first pair of images. Images can be aligned for example, using camera properties, e.g., focal length, as well as image information, e.g., pixel data. One technique for aligning images is described in U.S. Pat. No. 7,103,236, which is incorporated by reference.

One technique for forming a composite image from aligned component images projects the images onto a circular cylinder, i.e., generates a "cylindrical projection". A focal length and rotation angles associated with each image can be used to map the image onto a cylinder. For example, the orientation of the camera can be represented as a set of rotation angles from a reference orientation. The cylindrically mapped component images have less distortion than images mapped directly onto a plane. The cylinder can be unwrapped to derive a planar composite image, e.g., to print the composite image. A description of using cylindrical projections to form a composite image is provided in U.S. Pat. No. 7,006,707, which is incorporated by reference.

The composite image is often further processed to blend the seams of the overlapping component images. For example, pixel values along the seams of the overlapping component images can be modified to provide a smooth transition between the images.

SUMMARY

Systems, methods, and apparatus, including computer program products, are provided for forming composite images. In general, in one aspect, a method is provided. The method includes receiving a set of component images for forming a composite image and defining a first projection for the set of component images corresponding to a first reference frame. The method also includes identifying a plane corresponding to a point of view of the set of component images, where a normal to the plane corresponds to a second reference frame, defining a second projection for the set of component images corresponding to the second reference frame, the second reference frame corresponding to a rotation from the first reference frame defined using the normal of the identified plane, and rendering the composite image according to the second projection.

Implementations of the method can include one or more of the following features. Defining the first projection for the set of component images can include identifying a respective rotation matrix for each component image. Identifying a plane can further include identifying a vector from each rotation matrix, each vector corresponding to a viewing direction from a camera position to the respective component image and identifying a plane defined by the endpoints of each vector. Each vector can be a unit vector corresponding to a column in the rotation matrix of the respective component image.

Defining the second projection can further include determining an orientation for the normal of the identified plane, determining the orientation including using a count accumulated across the component images, the count including two counters incremented according to a product of a vector from the rotational matrix of each respective component image and each orientation of the normal. Defining a second projection can include calculating a rotational matrix for each component image as a product of an original rotational matrix and a second rotational matrix corresponding to the rotation to the reference frame of the identified plane.

In general, in one aspect, a computer program product is provided. The computer program product is encoded on a tangible program carrier and operable to cause data processing apparatus to perform operations. The operations include receiving a set of component images for forming a composite image, defining a first projection for the set of component images corresponding to a first reference frame, identifying a plane corresponding to a point of view of the set of component images, where a normal to the plane corresponds to a second reference frame, defining a second projection for the set of component images corresponding to the second reference frame, the second reference frame corresponding to a rotation from the first reference frame defined using the normal of the identified plane, and rendering the composite image according to the second projection.

In general, in one aspect, a system is provided. The system includes a user interface device and one or more computers operable to interact with the user interface device. The one or more computers operable to receive a set of component images for forming a composite image, define a first projection for the set of component images corresponding to a first reference frame, identify a plane corresponding to a point of view of the set of component images, where a normal to the plane corresponds to a second reference frame, define a second projection for the set of component images corresponding to the second reference frame, the second reference frame corresponding to a rotation from the first reference frame defined using the normal of the identified plane, and render the composite image according to the second projection.

Implementations of the system can include one or more of the following features. The one or more computers can include a server operable to interact with the user interface device through a data communication network, and the user interface device is operable to interact with the server as a client. The user interface device can include a personal computer running a web browser or a mobile telephone running a wireless application protocol (WAP) browser. The one or more computers can include one personal computer, and the personal computer can include the user interface device.

Particular embodiments of the subject matter described in this specification can be implemented to realize one or more of the following advantages. A panoramic image can be produced that is substantially straight when unrolled onto a plane. The straightened panoramic image can be cropped easily by a user (e.g., made rectangular in shape) without losing significant image detail. Additionally, the selection of an incorrect reference frame that prevents all images from being rendered is prevented.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
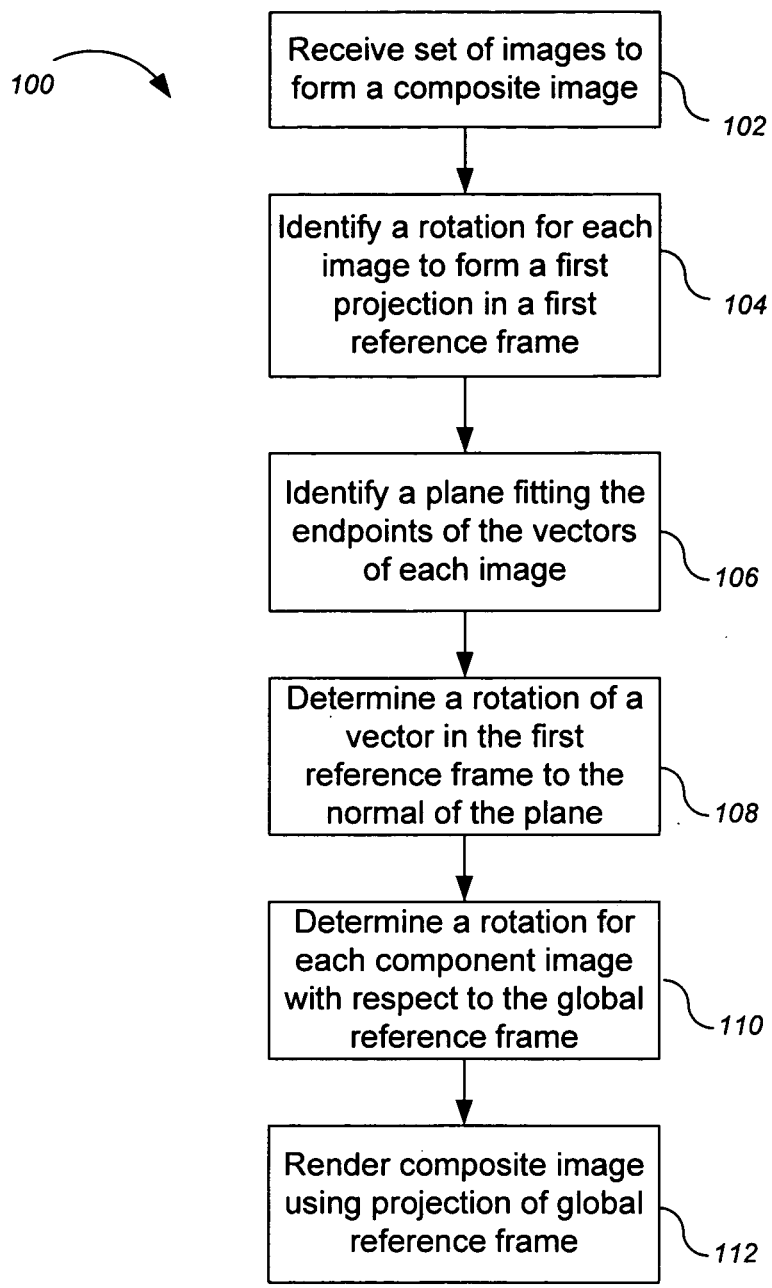
FIG. 1 illustrates an example process for rendering a composite image.

FIG. 1 illustrates an example process 100 for rendering a composite image. For convenience, the process will be described with reference to a computer system that performs the process. The system receives a set of component images to form a composite image (e.g., a panoramic image) (step 102). The component images can be generated, for example, using a camera rotating about a point in order to capture different sections of a view. For example, an individual can generate a first component image (e.g., take a picture) and then turn the camera by some angle (without translation) allowing the user to capture another section of the view in a second component image. A portion of the second component image overlaps a portion of the first component image, so that the component images can be assembled relative to each other.

To assemble the set of component images into a composite image, the system aligns the images and then projects the images to a surface. The images are aligned, for example, using information associated with the component images such as pixel information. The pixel information is used to identify overlapping points in the component images.

The system identifies a rotation for each component image to form a first projection in a first reference frame (step 104). To determine the location of each component image, a rotation is defined. The rotation of all component images is defined from the same reference frame (e.g., the position of the camera in space) to preserve the alignment of the component images relative to each other.

Once the rotation for each is identified, the images are projected onto the surface, for example a cylinder. In general, the cylinder has as its axis the axis around which the camera was rotated when capturing the component images. The particular cylinder for a set of component image is not initially known; instead it is identified using the component images. A cylinder or other shape is used because projections directly to a plane are limited and result in greater distortions away from the center. Using a cylinder as the surface of projection allows more images to be used in the composite image (e.g., 360 degree rotation) with less distortion. The particular cylindrical projection is defined using, for example, the focal length of the component images. The rotation defines the particular location of each projected component image on the surface of the cylinder.

The rotation of an image can be defined by a rotational matrix R. A rotational matrix provides a linear transform from a first space to a second space following some rotation along one or more axes (e.g., from an original point $x_1, y_1, z_1$ to a projected point $x_2, y_2, z_2$). The rotational matrix defines a system of linear equations rotating a component image in three dimensions to a position on a particular cylinder from a reference position in space (e.g., the camera position). In three dimensional space, the rotation about the x, y, and z axes can be represented by a 3×3 orthogonal matrix. Thus a rotation matrix R is defined as:

$$R = \begin{bmatrix} R_{11} & R_{12} & R_{13} \\ R_{21} & R_{22} & R_{23} \\ R_{31} & R_{32} & R_{33} \end{bmatrix}$$

The rotational matrix solely defines a rotation in space and not a transform with respect to other parameters, for example, scale (i.e., the rotational matrix describes an orthonormal transformation). Thus, for example, there is substantially no translation in the camera position, only rotation (however, if the images are at a large distance from the camera, small translation amounts of the camera can be ignored). Since the rotational matrix defines rotations about the three axes, an original vector has the same length as a projected vector rotated using the rotational matrix. Consequently, the rotational matrix has the property $RR^T=I$, where $R^T$ is the transpose of R and I is the identity matrix.

Figure 2A:
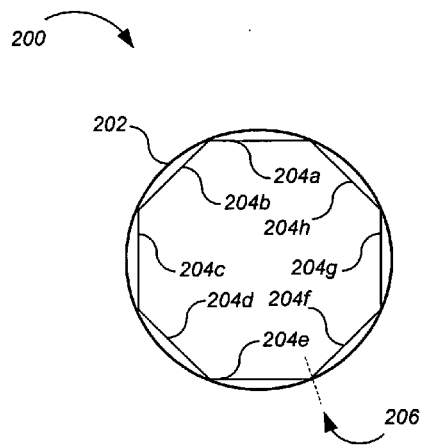
FIG. 2A illustrates an example top view of a cylindrical projection of a set of component images.

FIG. 2A illustrates an example top view 200 of a cylindrical projection for a set of component images. In FIG. 2A, a circular cross section of a cylinder 202 is shown. A number of component images 204*a-h* are shown positioned along the interior surface of the cylinder 202. The position of each component image 204*a-h* on the cylinder surface is defined by the rotational matrix corresponding to that image. For presenting, or rendering, the composite image (e.g., to print the composite image) the composite image can be unrolled from the cylinder and onto a plane. Line 206 represents where the cylinder can be "cut" to unroll the composite image to a plane. The line 206 can be selected, for example, as a point opposite a selected center of projection for the composite image (i.e., a particular image of the component images that serves as the center of the composite image). Consequently, when unrolled to a plane, the selected center image is in the middle and the images on either side of the "cut" are positioned to the right and left of the center image. FIG. 2A shows component images extending 360 degrees around the surface of the cylinder 202. However, other composite images can be formed by projecting the images onto a cylinder without having the component images form a full 360 degree view, or projected images including a view of more than 360 degrees.

Figure 2C:
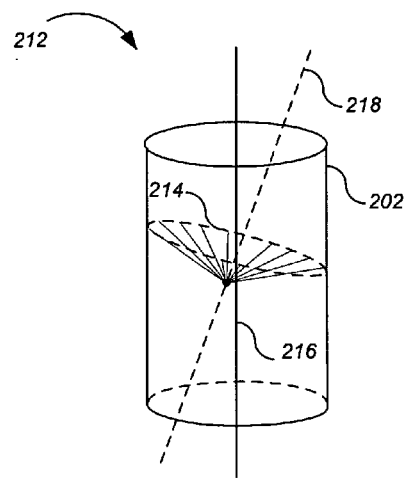
FIG. 2C illustrates an example representation of the cylindrical projection of FIG. 2A.
Figure 2B:
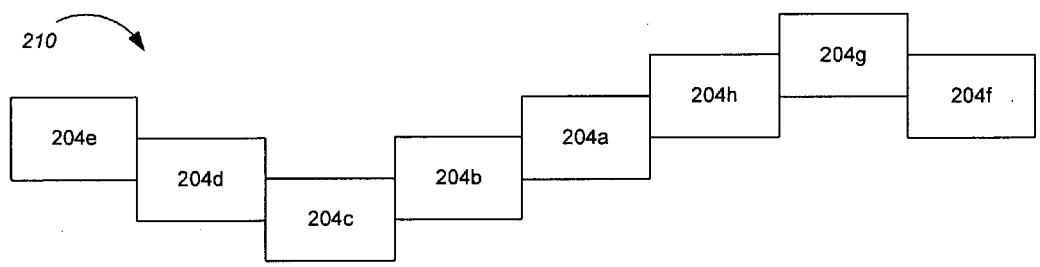
FIG. 2B illustrates an example composite image formed by unrolling the cylindrical projection of FIG. 2A onto a plane.

FIG. 2B illustrates an example composite image 210 formed from the unrolled cylindrical projection of FIG. 2A. Composite image 210 shows component images 204*a-h* where the composite image was unrolled by separating the cylinder at a point between component images 204*e* and 204*f*. Thus, it is as if the cylinder 202 were cut along the line 206 of FIG. 2A and unrolled onto a plane. Additionally, as shown in FIG. 2B, the composite image is not rectangular. The component images 204*a-h* are offset vertically from each other. This offset is a result of the cylindrical projection that is not perpendicular to an axis of the cylinder. For example, an individual manually operating a camera to capture component images of a view does not typically maintain the camera constantly horizontal. Instead, the user typically captures some component images at some vertical angle in addition to the rotation of the camera. This shifting of the camera angle causes a projection that is not coaxial with the cylinder.

FIG. 2C illustrates an example perspective view of the cylindrical projection of FIG. 2A. FIG. 2C shows the cylinder 202 having an axis 216. The cylindrical projection 214 is represented by a dotted line. The dotted line of the cylindrical projection 214 represents the centers of the image planes of the respective projected component images with reference to the first reference frame. The cylindrical projection 214 is at an angle relative to the cylinder 202. Thus, if a plane were taken as a slice of the cylinder 202 corresponding to the cylindrical projection 214, the plane would have a normal 218 that is at an angle with respect to the axis 216 of the cylinder 202.

The angle of the cylindrical projection 214 relative to the axis of the cylinder 202 causes the unrolled cylindrical projection to be curved. Thus, in order to produce a composite image that is straighter, the centers of the image planes should be perpendicular to the axis of the cylinder. In other words, the projection should correspond to a plane that has a normal corresponding to the axis of the cylinder the images are projected upon. An additional rotation is therefore needed such that the projection is orthogonal to the axis of a cylinder. The rotation identifies a reference frame corresponding to a cylinder having an axis perpendicular to the cylindrical projection. However, in an alternative implementation, the rotation can be described as a rotation of the projection to align with the existing cylinder.

For each component image, the rotational matrix defines a set of column vectors. Because of the constraints applied to the rotational matrix above, the column vectors are unit vectors (i.e., vectors each having a length of 1). The vector of the third column of the rotational matrix defines a vector corresponding to the direction of the viewing point to the component image (i.e., a vector from the camera to the image). For example, for a first component image, $C_1$ is the unit vector:

$$C_1 = \begin{bmatrix} R_{13} \\ R_{23} \\ R_{33} \end{bmatrix}$$

The set of component images define a set of unit vectors $C_i$. The origin of each vector $C_i$ is the camera position, which is assumed to be substantially the same for all component images. Thus, the set of vectors all have the same origin. Geometrically, the origin of the vectors can be considered the center of a unit sphere. The endpoints of the vectors $C_i$ define points on the sphere, forming a circle.

As shown in FIG. 1, the system identifies a plane that fits the endpoints of the vectors for each component image (step 106). The plane sliced through the sphere that includes the endpoints of the vectors results in a circular slice. In some implementations, not all points lie on a circle such that all points do not correspond to points on a single plane (e.g., when there are 4 or more points, they may not all perfectly match the same circle). Consequently, the identified plane is a plane that best fits all the endpoints.

The normal of the plane corresponds to an axis that passes through the center of the circle formed by the endpoints of the unit vectors (i.e., an axis passing through the camera position and the center of the circular image projection). Thus, the normal of the plane corresponds to a cylinder in the global reference frame that results in a cylindrical projection that is perpendicular to the axis of the cylinder.

Figure 3:
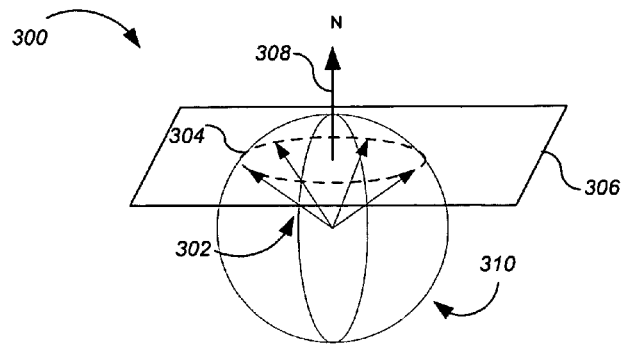
FIG. 3 is a diagram of unit vectors derived from the rotational matrix of each component image.

FIG. 3 is a diagram 300 of unit vectors 302 from the rotational matrix of each component image. As shown in FIG. 3, the endpoints of unit vectors 302 form a circle 304 on the surface of a sphere 310. A plane 306 can be identified that includes the endpoints of the unit vectors 302. The plane has a normal vector (N) 308. The normal vector 308 is orthogonal to the plane 306 and therefore is also orthogonal to the circle 304.

In some implementations, in addition to identifying the normal vector for the plane, the orientation of the normal vector is determined in order to identify up and down in the global reference frame. Otherwise, the composite image could be inverted, although other techniques could be used to flip the composite image (e.g., after rendering the composite image). To determine whether the identified normal vector is N or −N, a count is accumulated across the component images. Two counters are established, c and d, each initially set to zero. A vector $D_i$ is identified from each rotational matrix $R_i$, where each vector $D_i$ is the column vector corresponding to the second column of $R_i$ (each vector $D_i$ corresponds to the vertical axis of the respective component image). An inner product is calculated for each $D_i$ with N and −N. The results are $a_i = <C_i, N>$ and $b_i = <C_i, -N>$, where $a_i = b_i$. Therefore, if $a_i > 0.5$, c is incremented, if $a_i < -0.5$, d is incremented. After calculating for all the component images, c and d are compared. If c is larger, −N is used. If d is larger, N is used. If c and d are equal, either N or −N can be used. The resulting oriented vector will be called M.

The system determines a rotation of a vector in the first reference frame to the normal of the plane (step 108). For a reference image r, there is a rotation matrix dR that will rotate a vector $-D_r$ of the reference image into M. Thus, dR is an additional rotation that transforms a vector from the first reference frame to the global reference frame (i.e., defines a rotation to a cylinder having an axis corresponding to M). The system then determines a rotation for each component image with respect to the global reference frame (step 110). A new rotation matrix T is derived for each component image. The rotation matrix T is the ordinary matrix product of dR and the rotation matrix R for each respective component image: $T_i = (dR)(R_i)$. The resulting set of rotation matrices $T_i$ describes the rotations for the component images in the global reference frame.

Figure 4:
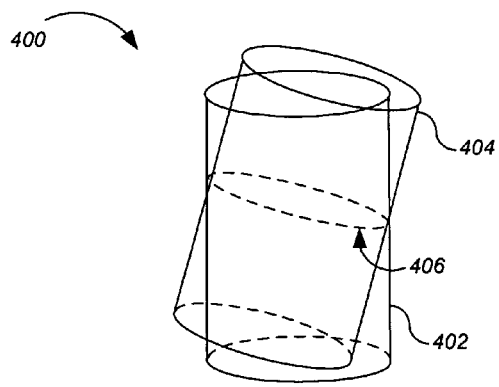
FIG. 4 is a diagram illustrating the effect of changing reference frames.

FIG. 4 is a diagram 400 illustrating the effect of changing reference frames. The diagram 400 shows a first cylinder 402 representing the cylindrical projection 406 with respect to the first reference frame. As discussed above, the first reference frame results in a cylindrical projection that is not perpendicular to the axis of the cylinder, which, when unrolled, produces a composite image that is curved. Diagram 400 also shows a second cylinder 404 representing the cylindrical projection 406 with respect to the global reference frame. Thus, cylinder 404 represents a rotation of cylinder 402 such that the cylinder 404 has an axis corresponding to M, and which results in a cylindrical projection that is perpendicular to the axis of cylinder 404.

The system renders a composite image using the global reference frame (step 112). The component images are projected onto a cylinder using the set of rotational matrices $T_i$. The composite image can be rendered, for example, by unrolling the cylindrical projection onto a plane. The unrolled composite image will be straighter due to the change in reference frames than the unrolled composite image in the first reference frame. The composite image can then be displayed, for example, on a display device, e.g., a computer monitor, or printed.

Figure 5:
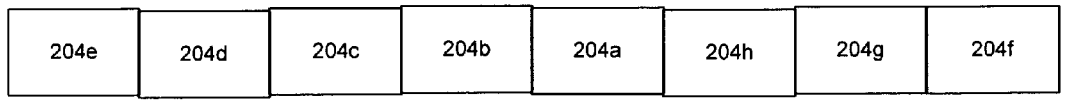
FIG. 5 illustrates an example composite image using the global reference frame.

FIG. 5 illustrates an example composite image 500 using the global reference frame. The composite image 500 includes component images 402a-f which have been unwrapped from a cylindrical projection in a similar manner to that described above with reference to FIG. 2B. However, since the rotational matrices use the global reference frame as the source of the projection, the cylindrical projection was substantially perpendicular to the axis of the cylinder than in FIG. 2C. As a result, the composite image 500 is straighter than the composite image 210.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, a composition of matter, or a combination of one or more of them. The computer-readable medium is non-transitory in nature and stores computer-useable instructions.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, by a computer, a set of component images for forming a composite image;
   defining, by the computer, a first projection for the set of component images corresponding to a first reference frame, in which defining the first projection for the set of component images includes identifying a respective rotation matrix for each component image;
   identifying, by the computer, a plane corresponding to respective points of view of the set of component images, where a normal to the plane corresponds to a second reference frame, and where identifying further comprises identifying a vector from each respective rotation matrix, each vector corresponding to a viewing direction from a camera position to the respective component image and identifying the plane defined by the endpoints of the vectors;
   defining, by the computer, a second projection for the set of component images corresponding to the second reference frame, the second reference frame corresponding to a rotation from the first reference frame defined using the normal of the identified plane; and
   rendering, by the computer, the composite image according to the second projection.

2. The method of claim 1, where each vector is a unit vector corresponding to a column in the rotation matrix of the respective component image.

3. The method of claim 1, where defining the second projection further comprises determining an orientation for the normal of the identified plane, determining the orientation including using a count accumulated across the component images, the count including two counters incremented according to a product of a vector from the rotational matrix of each respective component image and each orientation of the normal.

4. The method of claim 1, where defining a second projection includes calculating a rotational matrix for each component image as a product of an original rotational matrix and a second rotational matrix corresponding to the rotation to the reference frame of the identified plane.

5. A computer program product, encoded on a non-transitory computer readable medium, operable to cause data processing apparatus to perform operations comprising:
   receiving a set of component images for forming a composite image;
   defining a first projection for the set of component images corresponding to a first reference frame, in which defining the first projection for the set of component images includes identifying a respective rotation matrix for each component image;
   identifying a plane corresponding to respective points of view of the set of component images, where a normal to the plane corresponds to a second reference frame, and where identifying further comprises identifying a vector from each respective rotation matrix, each vector corresponding to a viewing direction from a camera position to the respective component image and identifying the plane defined by the endpoints of the vectors;
   defining a second projection for the set of component images corresponding to the second reference frame, the second reference frame corresponding to a rotation from the first reference frame and the second reference frame defined using the normal of the identified plane; and
   rendering the composite image with respect to the second reference frame.

6. The computer program product of claim 5, where each vector is a unit vector corresponding to a column in the rotation matrix of the respective component image.

7. The computer program product of claim 5, where defining the second projection further comprises determining an orientation for the normal of the identified plane, determining the orientation including using a count accumulated across the component images, the count including two counters incremented according to a product of a vector from the rotational matrix of each respective component image and each orientation of the normal.

8. The computer program product of claim 5, where defining a second projection includes calculating a rotational matrix for each component image as a product of an original rotational matrix and a second rotational matrix corresponding to the rotation to the reference frame of the identified plane.

9. A system comprising:
   a user interface device; and
   one or more computers operable to interact with the user interface device and to:
   receive a set of component images for forming a composite image;
   define a first projection for the set of component images corresponding to a first reference frame, in which defining the first projection for the set of component images includes identifying a respective rotation matrix for each component image;
   identify a plane corresponding to respective points of view of the set of component images, where a normal to the plane corresponds to a second reference frame, and where identifying further comprises identifying a vector from each respective rotation matrix, each vector corresponding to a viewing direction from a camera position to the respective component image and identifying the plane defined by the endpoints of the vectors;
   define a second projection for the set of component images corresponding to the second reference frame, the second reference frame corresponding to a rotation from the first reference frame and the second reference frame defined using the normal of the identified plane; and render the composite image with respect to the second reference frame.

10. The system of claim 9, wherein the one or more computers comprise a server operable to interact with the user interface device through a data communication network, and the user interface device is operable to interact with the server as a client.

11. The system of claim 10, wherein the user interface device comprises a personal computer running a web browser or a mobile telephone running a WAP browser.

12. The system of claim 9, wherein the one or more computers comprises one personal computer, and the personal computer comprises the user interface device.

* * * * *